(12) United States Patent
Kerr et al.

(10) Patent No.: US 8,496,386 B2
(45) Date of Patent: Jul. 30, 2013

(54) FERRULES HAVING AN ANTI-ROTATION FEATURE AND FIBER OPTIC CONNECTORS USING THE SAME

(75) Inventors: Sean M. Kerr, Keller, TX (US); Louis E. Parkman, III, Richland Hills, TX (US); Glenn G. Riddell, McKinney, TX (US)

(73) Assignee: Corning Cable Systems LLC, Hickory, NC (US)

( * ) Notice: Subject to any disclaimer, the term of this patent is extended or adjusted under 35 U.S.C. 154(b) by 143 days.

(21) Appl. No.: 12/649,874

(22) Filed: Dec. 30, 2009

(65) Prior Publication Data

US 2011/0158592 A1    Jun. 30, 2011

(51) Int. Cl.
*G02B 6/36* (2006.01)
(52) U.S. Cl.
USPC .................................. 385/78; 264/1.25
(58) Field of Classification Search
USPC ................................. 385/60, 72, 78
See application file for complete search history.

(56) References Cited

U.S. PATENT DOCUMENTS

| | | | |
|---|---|---|---|
| 4,763,980 A | | 8/1988 | Gerber et al. |
| 4,867,525 A | | 9/1989 | DiMarco et al. |
| 4,994,134 A | | 2/1991 | Knecht et al. |
| 5,259,059 A | | 11/1993 | Abramov |
| 5,375,183 A | * | 12/1994 | Edwards et al. ............... 385/60 |
| 5,720,907 A | * | 2/1998 | Anderson et al. ............. 264/1.25 |
| 5,751,875 A | * | 5/1998 | Edwards et al. ................ 385/84 |
| 5,764,836 A | | 6/1998 | Roff |
| 5,940,561 A | | 8/1999 | Dean, Jr. et al. |
| 6,238,278 B1 | * | 5/2001 | Haftmann ....................... 451/279 |
| 6,283,643 B1 | | 9/2001 | Serizawa |
| 6,550,979 B1 | | 4/2003 | Fleenor et al. |
| 6,599,029 B2 | | 7/2003 | Yamazaki et al. |
| 6,877,908 B2 | | 4/2005 | Nakanishi et al. |
| 7,031,576 B2 | | 4/2006 | Deane |
| 7,195,400 B2 | | 3/2007 | Asano et al. |
| 7,195,401 B2 | | 3/2007 | Moll et al. |
| 7,387,448 B2 | | 6/2008 | Kohda |
| 7,566,175 B2 | | 7/2009 | Scheibenreif et al. |
| 2002/0034361 A1 | | 3/2002 | Kashihara et al. |
| 2002/0034362 A1 | | 3/2002 | Yamazaki et al. |
| 2002/0176669 A1 | | 11/2002 | Okamoto |
| 2003/0031426 A1 | | 2/2003 | Nakanishi et al. |
| 2005/0018969 A1 | | 1/2005 | Deane |
| 2005/0220424 A1 | | 10/2005 | Asano et al. |

FOREIGN PATENT DOCUMENTS

| EP | 1312956 A1 | 5/2003 |
|---|---|---|
| EP | 1394584 A2 | 3/2004 |

* cited by examiner

*Primary Examiner* — Sarah Hahm

(57) ABSTRACT

Ferrules having anti-rotation features along with fiber optic connectors using the same are disclosed. The ferrules have a body with a first diameter and at least one bore extending from a rear end of the ferrule to a front end of the ferrule. The ferrule has at least one anti-rotation feature such as a rib. The ferrule may be part of a ferrule assembly that includes a ferrule holder where the anti-rotation feature improves the bond between the ferrule and the ferrule holder. Methods for making the ferrules and assemblies using the ferrule are also disclosed.

24 Claims, 19 Drawing Sheets

FERRULES HAVING AN ANTI-ROTATION FEATURE AND FIBER OPTIC CONNECTORS USING THE SAME

BACKGROUND

1. Field

The disclosure is directed to ferrules having an anti-rotation feature along with assemblies and fiber optic connectors using the same. More specifically, the disclosure is directed to ferrules that have the anti-rotational feature formed thereon.

2. Technical Background

Optical fiber is increasingly being used for a variety of applications, including but not limited to broadband voice, video, and data transmission. Fiber optic connectors are used for making optical connections in the optical network. One type of fiber optic connector uses a ferrule as a component of the fiber optic connector where a portion of the ferrule is held by a ferrule holder. Generally speaking, the optical fiber is attached to the ferrule using an adhesive or the like and then a conventional polishing process may be used to finish the end of the optical fiber and ferrule.

FIG. 1 shows a perspective view of a conventional notched ferrule 10. Conventional notched ferrule 10 includes a notch for securing it with a ferrule holder molded therearound as known in the art. Ferrule 10 also has a bore (not numbered) from a rear end 11 to a front end 13 for receiving an optical fiber therein. Notch 18 has a flat surface at the rear end 11 that is formed during a secondary machining process. Specifically, ferrule 10 is manufactured such as by extruding or injection molding a material such as a ceramic into a ferrule blank and then sintering for curing the same. Thereafter, a single notch 18 is formed in ferrule 10 using a secondary grinding operation to form the flat surface as shown. Then the ferrule can be further processed and used with a ferrule holder as a portion of a fiber optic connector.

Fiber optic connectors are typically mated together using an adapter or the like that precisely aligns the optical fiber connector with the mating optical device such as a mating ferrule. The adapter aligns and holds the fiber optic connector in position so that the optical connection may be made. However, forces on the fiber optic connector or its cabling can cause damage of the fiber optic connection and result in failure. Simply stated, forces on the fiber optic connector or cabling can cause damage by allowing the ferrule and the ferrule holder in the fiber optic connector to break the bond therebetween. By way of example, FIG. 2 shows a cross-sectional view of ferrule 10 taken along line 2-2 with a force F applied to ferrule 10. As shown, force F produces a torque about a bore 109 (i.e., the optical fiber) that acts at a contact angle α to produce a rotational force at the notch 18. Force F may be broken down into two component forces: $F\mu$ and $F_N$ as shown. If sufficient force and/or movement is applied to the cabling or fiber optic connectors, then undesirable levels of optical attenuation may occur disrupting network traffic.

Typically, the optical networks include patch panels, data centers, and the like where a high density optical connections are performed using fiber optic connectors. Moves, adds and changes to the optical network are typically done at and around these high density optical connection locations and may disturb (i.e., move or pull) the cabling which may disrupt the optical signals.

SUMMARY

Embodiments of the disclosure are directed to ferrules having anti-rotation features along with fiber optic connectors using the same. Within a fiber optic connector the ferrule is typically a portion of a ferrule assembly that includes a ferrule holder molded about a rear portion of the ferrule. The disclosed ferrules have a body with a first diameter and at least one bore extending from a rear end of the ferrule to a front end of the ferrule. In one embodiment, the ferrule has at least one anti-rotation portion. The anti-rotation feature provide an improved ferrule design that improves structural integrity. Methods for making the ferrules and assemblies including the ferrules are also disclosed.

Additional features and advantages will be set forth in the detailed description which follows, and in part will be readily apparent to those skilled in the art from that description or recognized by practicing the same as described herein, including the detailed description that follows, the claims, as well as the appended drawings.

It is to be understood that both the foregoing general description and the following detailed description present embodiments that are intended to provide an overview or framework for understanding the nature and character of the claims. The accompanying drawings are included to provide a further understanding of the disclosure, and are incorporated into and constitute a part of this specification. The drawings illustrate various embodiments and together with the description serve to explain the principles and operation.

DETAILED DESCRIPTION OF THE PREFERRED EMBODIMENTS

Reference will now be made in detail to the preferred embodiments of the disclosure, examples of which are illustrated in the accompanying drawings. The embodiments and methods described herein are suitable for ferrules used in fiber optic connectors and associated components therefor. The concepts of the disclosure advantageously provide ferrules having one or more anti-rotation features and may eliminate the secondary processing steps for creating the anti-rotation features. The ferrules and ferrule assemblies disclosed herein are advantageous since they provide improved structural integrity. Specifically, the torques applied during by a user may break the bond between the ferrule and the ferrule holder allowing the optical fiber held by the ferrule to twist and break, thereby causing catastrophic failure of the fiber optic connector. Additionally, the ferrules disclosed may be used as a component of any suitable connector such as SC, LC, FC, ST, MU, and the like. Reference will now be made in detail to the preferred embodiments, examples of which are illustrated in the accompanying drawings. Whenever possible, like reference numbers will be used to refer to like components or parts.

Figure 3:
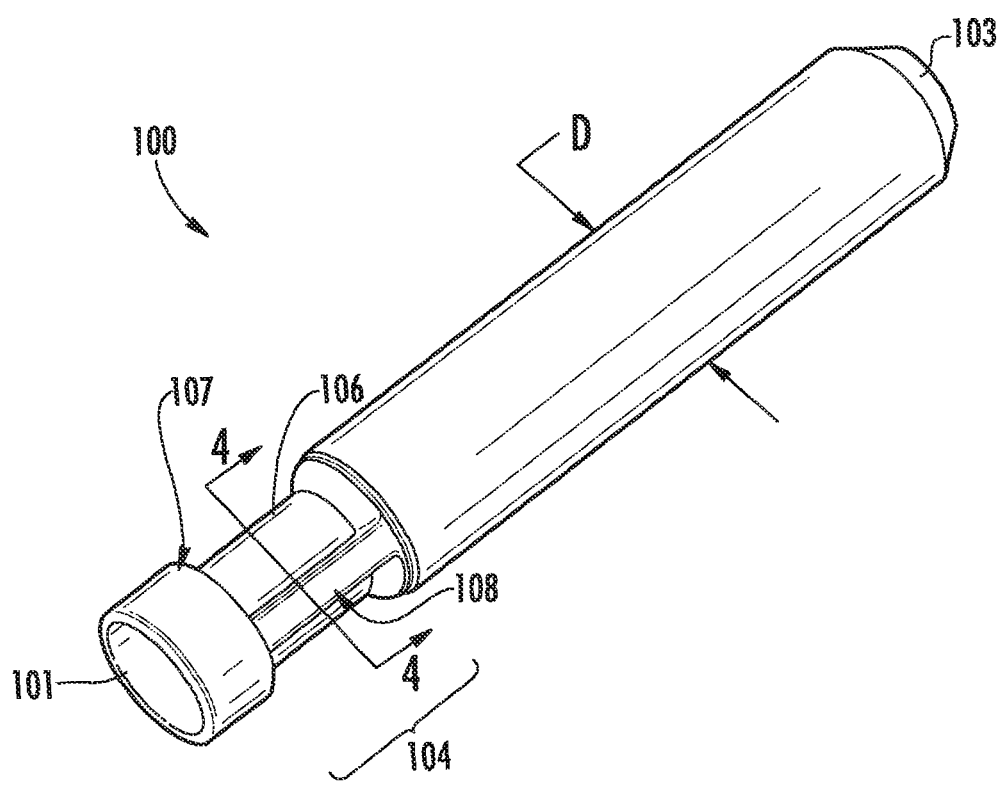
FIG. 3 is a perspective view of a ferrule having at least one anti-rotation feature.

FIG. 3 depicts a perspective view of a ferrule 100 having at least one molded recess portion 104 for inhibiting rotation and/or translation of ferrule 100 when it is secured by a ferrule holder. Molded recess portion 104 of ferrule 100 has features that are formed when molding ferrule 100, which advantageously eliminates the need for a secondary machining process for creating the anti-rotation and/or anti-translation features as done with conventional ferrules. Besides eliminating secondary machining process for creating features, molding allows improved structural integrity as discussed herein. As shown, ferrule 100 has a body (not numbered) with a first diameter D and at least one bore 109 extending from a rear end 101 of the ferrule 100 to a front end 103 of the ferrule 100 for receiving an optical fiber therein. Bore 109 may include a lead-in portion (not numbered) at the rear end 101 and/or other geometry as known in the art.

Figure 16:
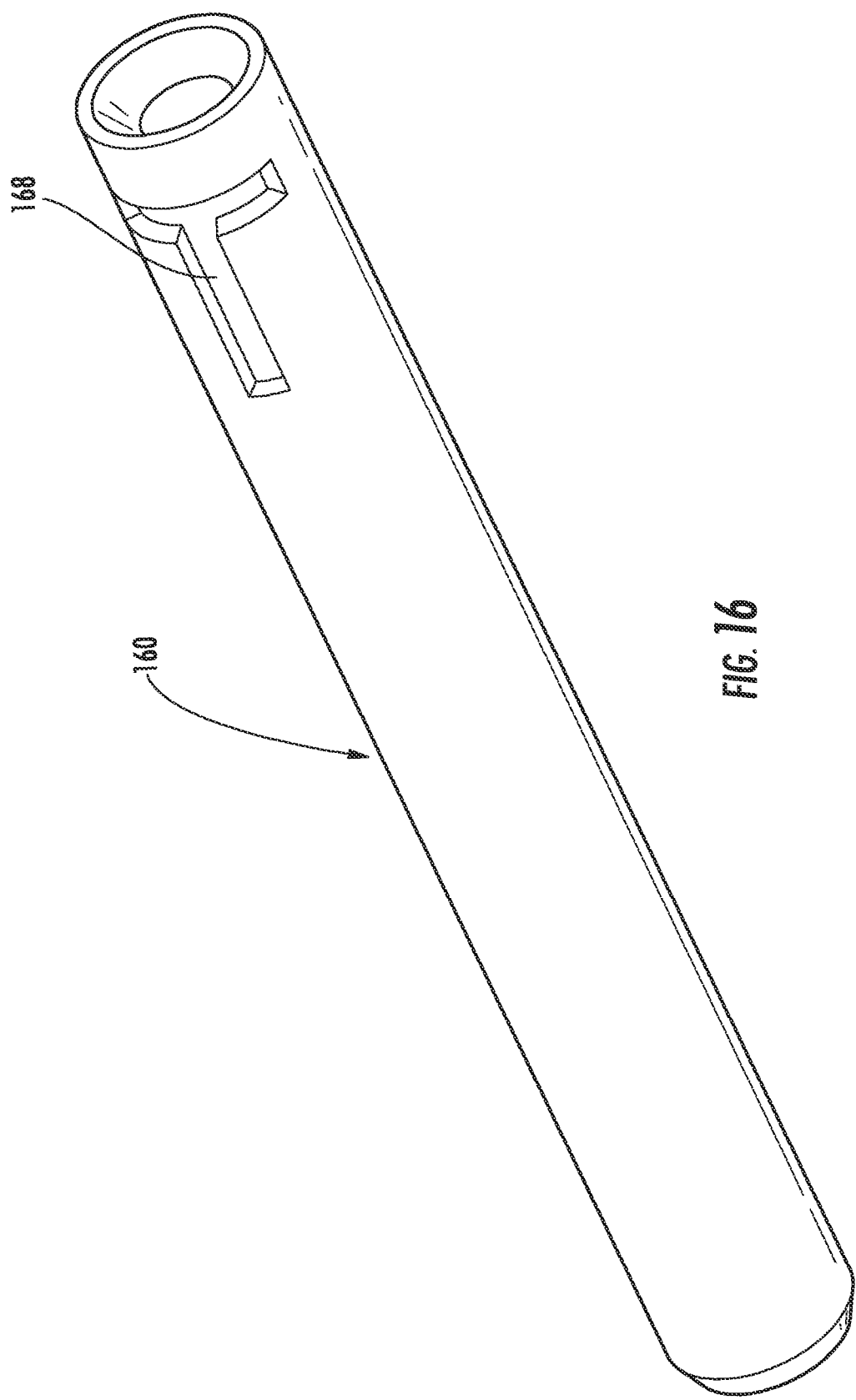
FIG. 16 is a perspective view of a ferrule having at least one female anti-rotation feature.

More specifically, the molded recess portion 104 includes at least one recessed portion 106 adjacent to at least one anti-rotation portion 108 (i.e., a rib). The at least one recessed portion 106 has a second dimension that is smaller than the first diameter D of ferrule 100 and generally inhibits longitudinal movement using the front and rear step-down portions (not numbered) of the recessed portion 106 that engage with the ferrule holder. In this embodiment, the anti-rotation portions 108 extend from ferrule 100 and have an outer dimension that is generally larger than the recessed portion 106 such as essentially the same as the first diameter D of ferrule 100, but other dimensions that are larger than the recessed portion 106 are possible. In other embodiments, the anti-rotation portions may extend beyond the first diameter D of the ferrule or recessed below first diameter D. In still other embodiments, the anti-rotation portions may be female ribs formed into the ferrule as shown in FIG. 16; instead of a male rib extending from the ferrule.

The ferrules and ferrule assemblies disclosed herein are advantageous since they provide an improved bond between the ferrule holder and the ferrule. For instance, if the craft twists the dust cap on or off the ferrule with too much force it may apply a torque that breaks the bond between the ferrule and ferrule holder. If this bond between the ferrule and ferrule holder is broken it allows the optical fiber held by the ferrule to twist as the ferrule rotates. Thus, breaking of the bond between the ferrule and ferrule holder may cause a catastrophic failure of the fiber optic connector.

FIG. 3 shows recessed portion 106 with a barrel shape, but other shapes are possible such as planar or generally flat surfaces and the like. As used herein, a barrel portion is a profile of the recesses portion that is attached to an anti-rotation portion. As depicted in this embodiment, the molded recessed portion 104 has two recessed portions 106 separated by two anti-rotation portions 108, but other embodiment can have other suitable numbers of recessed portions and/or anti-rotation portions such as more than two recessed portions and anti-rotation portions.

Figure 8:
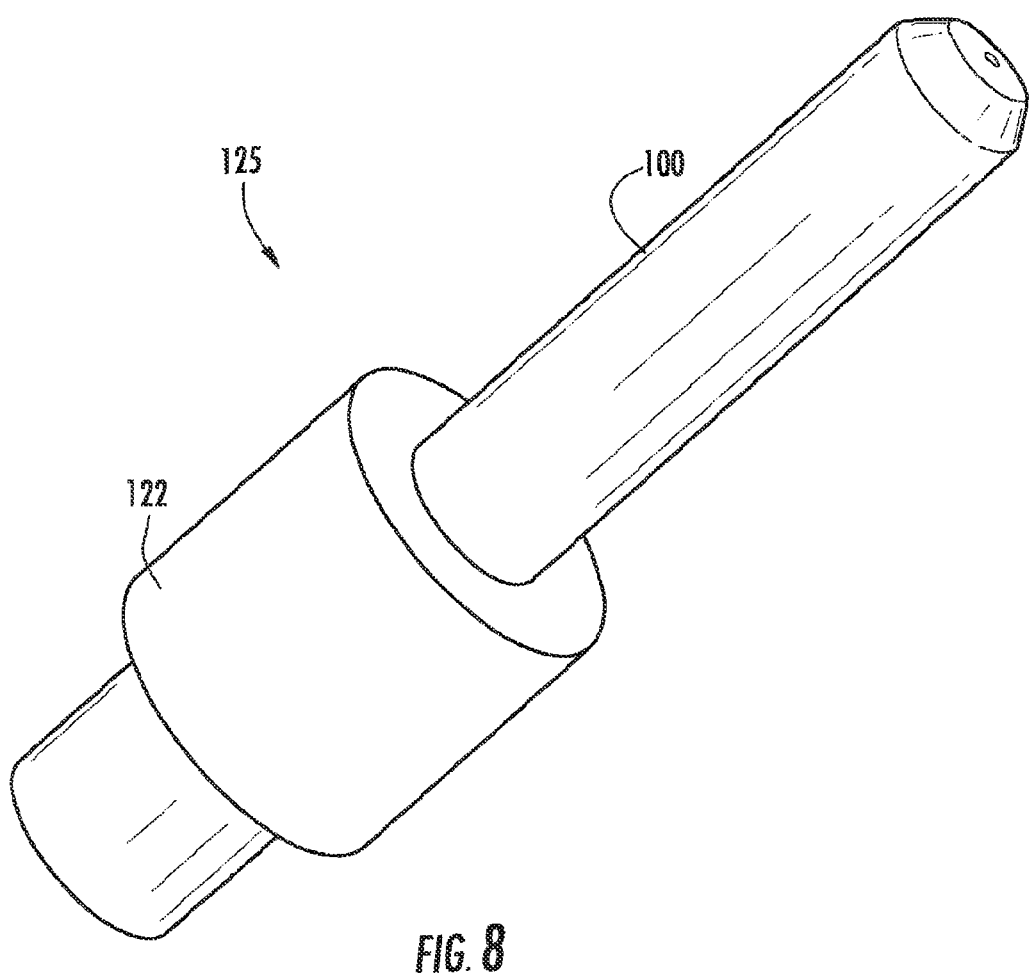
FIG. 8 is a perspective view of the ferrule of FIG. 3 having a ferrule holder molded about a portion of the same.

The molded recessed portion of the disclosed ferrules inhibits both longitudinal movement and rotation movement between a ferrule holder that is molded over a portion of ferrule 100 as shown in FIG. 8. Simply stated, the recessed portions 106 inhibits longitudinal movement relative to the ferrule holder and the anti-rotation portions 108 inhibit rotation relative to the ferrule holder. Additionally, the geometry of the anti-rotation portion 108 may reduce the contact angle applied to the ferrule when a force F is applied, thereby inhibiting damage and failure of the fiber optic connector. The force F (or torque) is shown with a moment arm that passes through the centerline of the ferrule.

Figure 1:
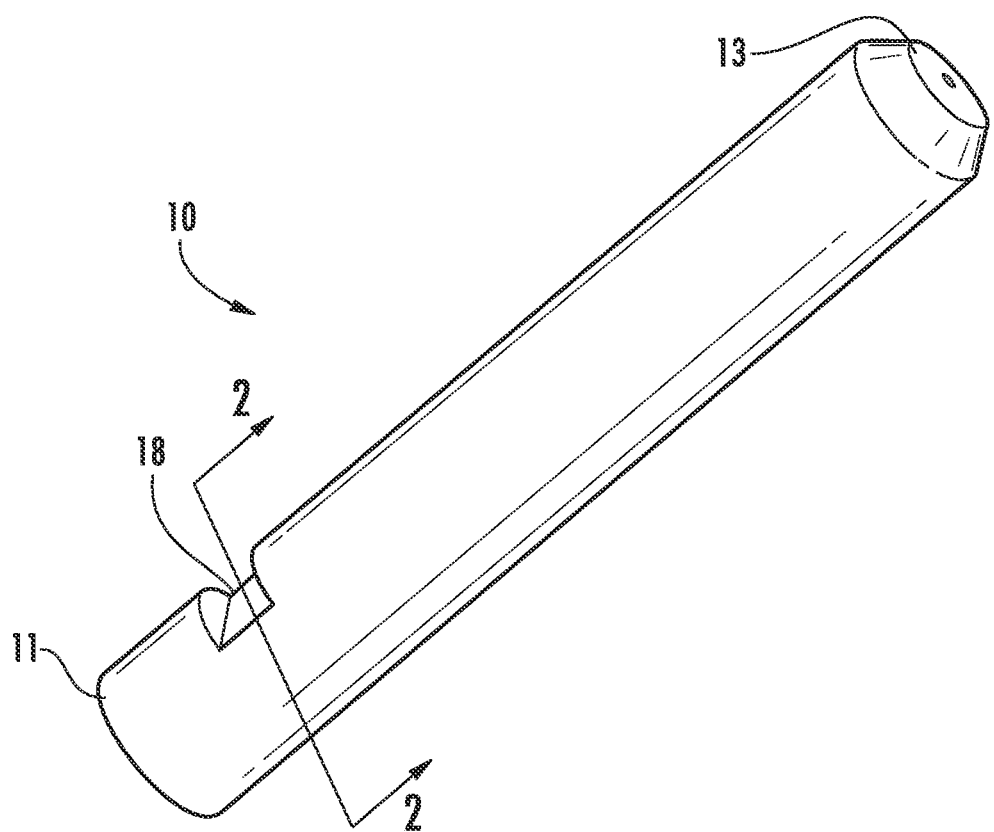
FIG. 1 is a perspective view of a conventional ferrule for a fiber optic cable that has a notch ground into a rear portion of the same in a secondary manufacturing process.
Figure 4:
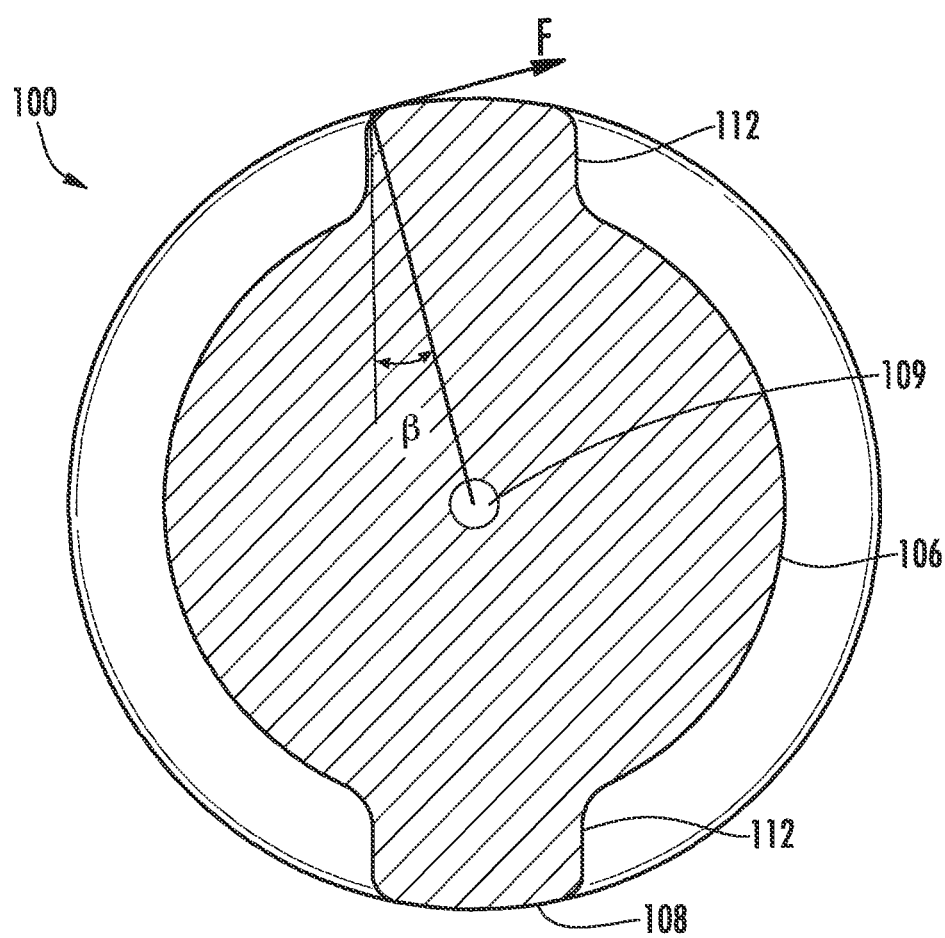
FIG. 4 is a cross-sectional view of the ferrule of FIG. 3 taken at line 4-4 showing the angle of a moment arm when a rotational force is applied to the ferrule.

By way of example, FIG. 4 depicts a cross-sectional view of ferrule 100 taken through the molded recess portion 104 along line 4-4. Ferrule 100 has two recessed portions 106 that are separated by the two anti-rotation portions 108. The anti-rotational portions 108 have respective sidewalls 112. In this embodiment, the sidewalls 112 are generally parallel to each other and advantageously reduce a contact angle β of a rotation force F applied to the ferrule 100 compared with the conventional ferrule of FIGS. 1 and 2. In other words, contact angle β of ferrule 100 is essentially parallel to a centerline of the anti-rotation feature 108 (i.e., rib). The reduction between the contact angle α of the conventional notched ferrule 10 and the contact angle β in ferrule 100 improves the structural integrity of the ferrule holder assembly of the fiber optic connectors when stressed such as when cleaning or when twisting the dust cap onto the ferrule.

Figure 5:
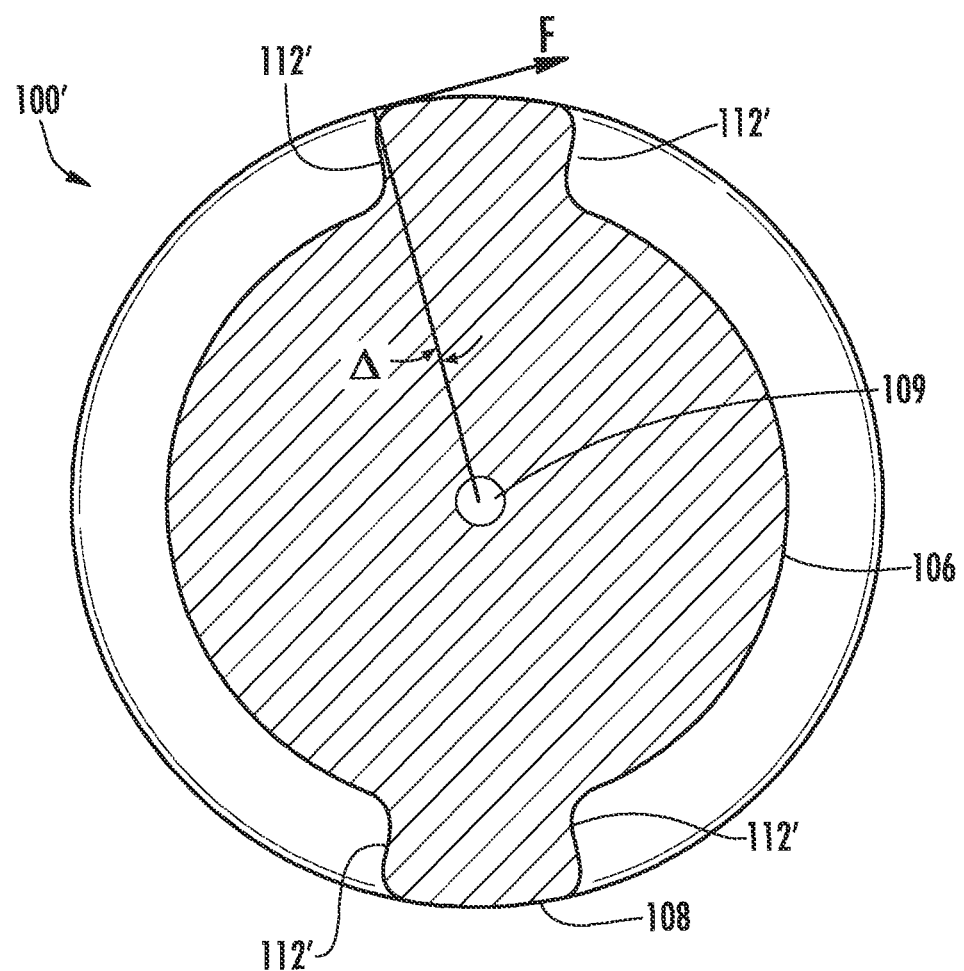
FIG. 5 is a cross-sectional view of the another ferrule having an angled rib for reducing the angle of a moment arm when a rotational force is applied to the ferrule.

Other variations of ferrules according to the disclosed concepts are possible. For instance, ferrules can have other suitable contact angles. By way of example, FIG. 5 shows another ferrule 100' having anti-rotation portions 108 with sidewalls 112' that are not parallel with each other, thereby producing a contact angle Δ. Simply stated, sidewalls 112' are skewed inward toward the centerline of the anti-rotation feature 108 (i.e., the rib) as shown. Forming sidewalls 112' with a non-parallel orientation provides a reduction in the contact angle compared with ferrule 100. By way of example, ferrule 100' has a contact angle Δ that is two degrees or less. However, other embodiments could have contact angles that are less than two degrees such as zero or even negative in value (i.e., less than two degrees).

Figure 2:
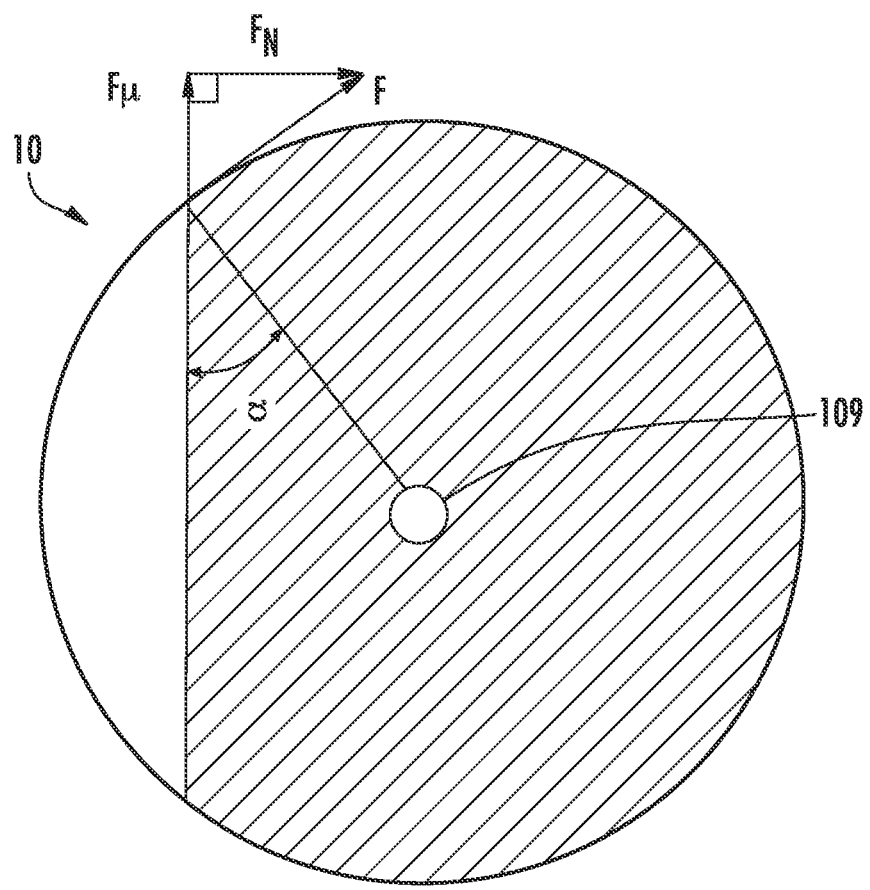
FIG. 2 is a cross-sectional view of the conventional ferrule of FIG. 1 at the notched portion showing the angle of a moment arm when a rotational force is applied to the ferrule.

Ferrules with relatively small contact angles such as ten degrees or less provide in improved rotation retention with the ferrule holder. For instance, when the force F is applied it is transferred between ferrule 100' and the associated ferrule holder so that the force acts a on a perpendicular plane of the sidewall of the ferrule rather than along a chord of the outer diameter of the ferrule such as shown in FIG. 2 with the conventional ferrule 10. Consequently, reducing the contact angle makes the Fμ component (the sliding force) of the force F smaller. When Fμ approaches zero the structural integrity is then only limited by the material strength of the components and geometry. In other words, reducing the shear forces at the interface between the ferrule and ferrule holder makes for a more robust assembly.

Figure 6:
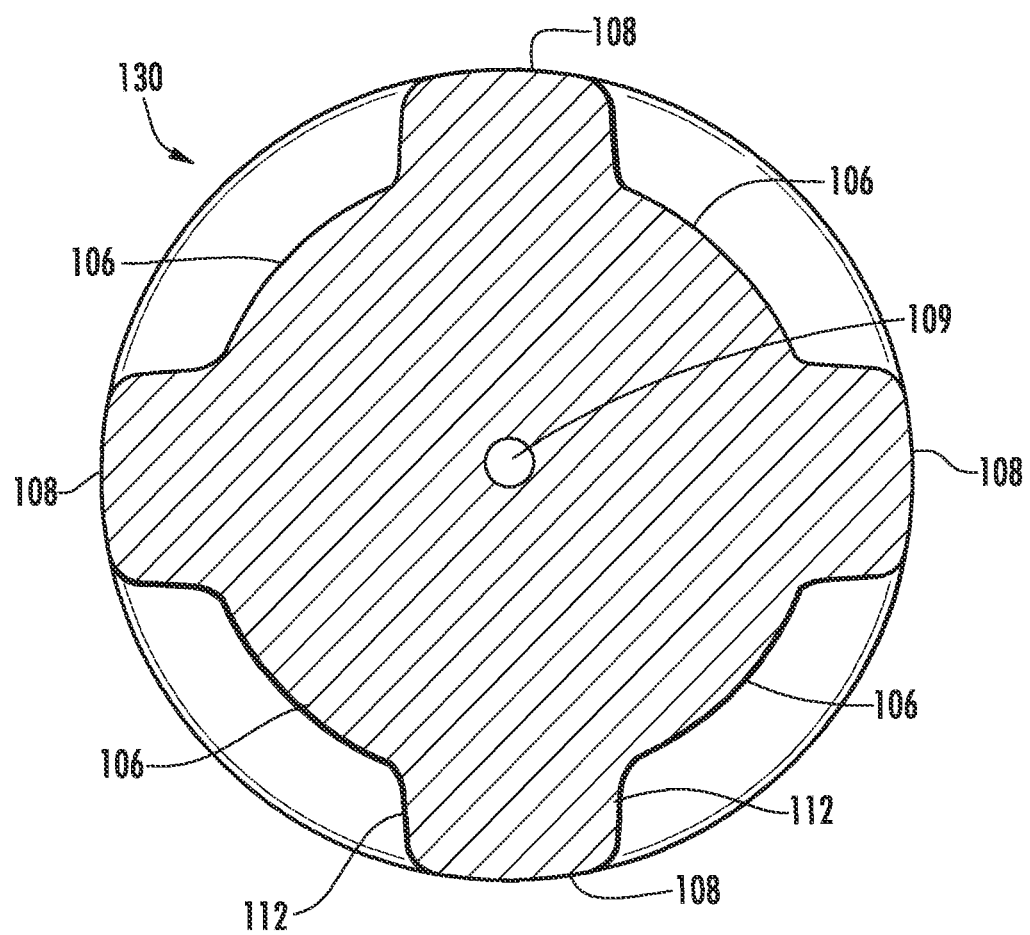
FIGS. 6 and 7 are cross-sectional views of yet other ferrules having more than two anti-rotation features.

Still other variations of ferrules according to the concepts disclosed are possible. For instance, FIG. 6 shows a ferrule 130 having four recessed portions 106 and four anti-rotation portions 108. In this embodiment, the recessed portions 106 and anti-rotation portions 108 are shown spaced apart at equal distances, but unequal spacing of portions is also possible but may not perform as well. Anti-rotation portions 108 (i.e., the ribs) have respective sidewalls 112 (not all instances of which are numbered for clarity) that are slightly angled outward away from the centerline as they approach respective recessed portions 106. In this embodiment, sidewalls 112 are angled as discussed manner so that the respective cores of the mold may be easily removed; however, there are other mold configurations and/or ferrule designs that may be used with more than two recessed portions and anti-rotation portions.

Figure 7:
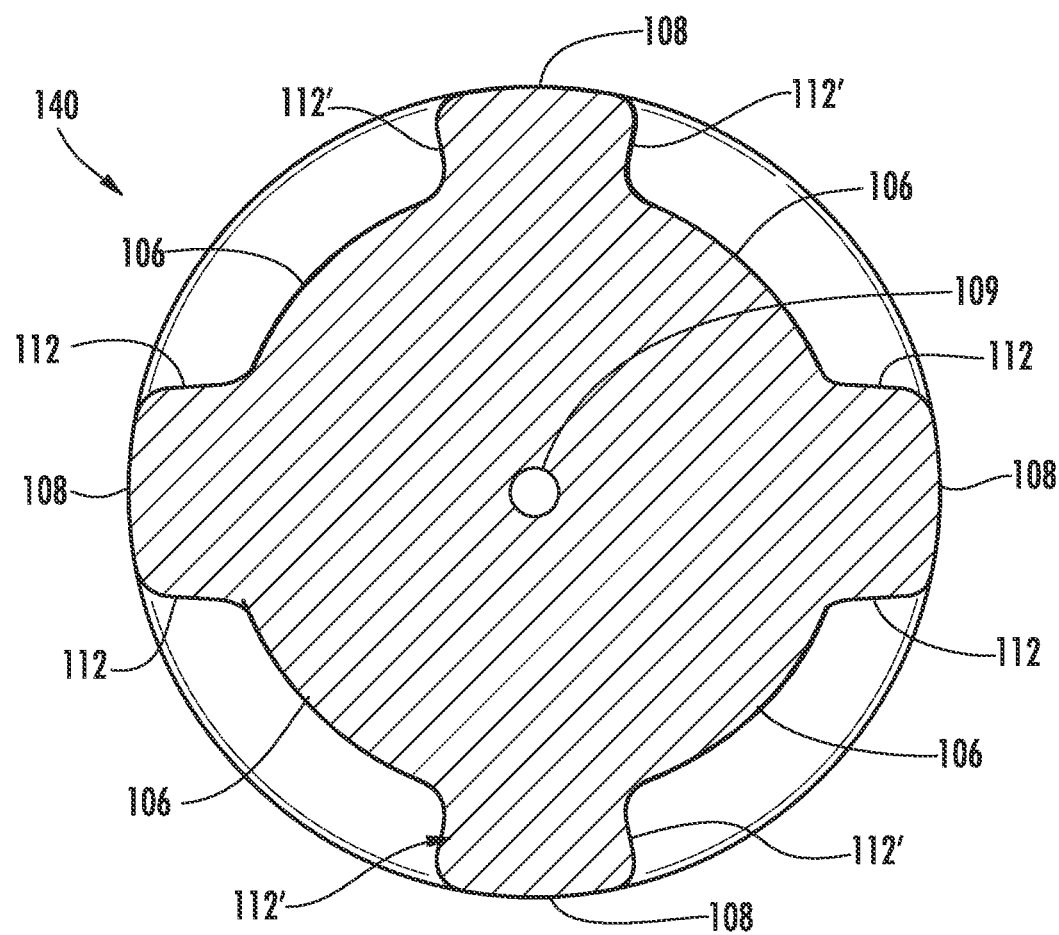

Illustratively, FIG. 7 shows a cross-section of a ferrule 140 taken through the molded recess portion. Ferrule 140 is similar to ferrule 130, except it has anti-rotation portions 108 with different shapes. Simply stated, the anti-rotation portions 108 at the north and south positions have sidewalls 112' with a non-parallel orientation for providing a reduction in the contact angle. On the other hand, the anti-rotation portions 108 at the east and west positions have sidewalls 112 that are angled slightly outward for allowing release of the ferrule from the mold using slides like depicted in FIGS. 18 and 19. Thus, ferrule 140 is a design that has hybrid anti-rotation portions so that it can be released from the appropriate mold (i.e., drafts for mold separation on the east and west anti-rotation portions). Other ferrule designs could have all of the anti-rotation portions with sidewalls having a non-parallel orientation for providing a reduction in the contact angle, but the mold would have to be designed accordingly such as with four slides.

Figure 9:
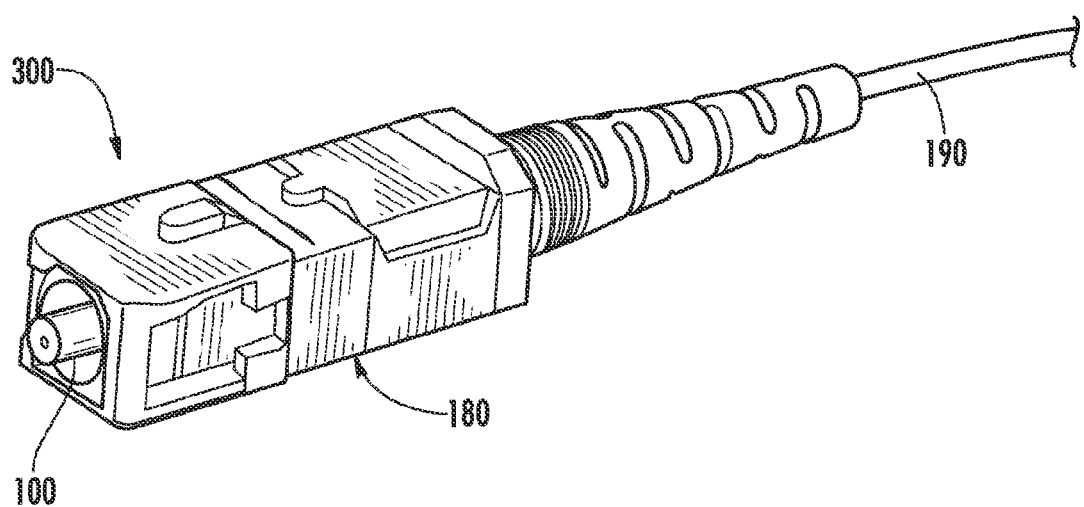
FIG. 9 is a perspective view of a fiber optic connector that includes the ferrule and ferrule holder of FIG. 8 as a portion of a cable assembly.

FIG. 8 shows a ferrule assembly 125 having ferrule 100 with a ferrule holder 122 molded over a rear portion thereof. In this embodiment, ferrule holder 122 is molded over a rear portion of ferrule 100. Likewise, the other ferrules disclosed herein can have a ferrule holder molder over a rear portion thereof. Ferrule assembly 125 is used for forming a portion of a suitable fiber optic connector as known in the art. By way of example, FIG. 9 depicts ferrule assembly 125 as a portion of a fiber optic connector 180. More specifically, FIG. 9 depicts that fiber optic connector 180 is a portion of a cable assembly 300 that includes a fiber optic cable 190 attached to the fiber optic connector 180. In this embodiment, ferrule assembly 125 is a portion of a SC fiber optic connector, but ferrules and associated ferrule assemblies may be used with any suitable type of fiber optic connector and/or cable assembly.

Figure 10:
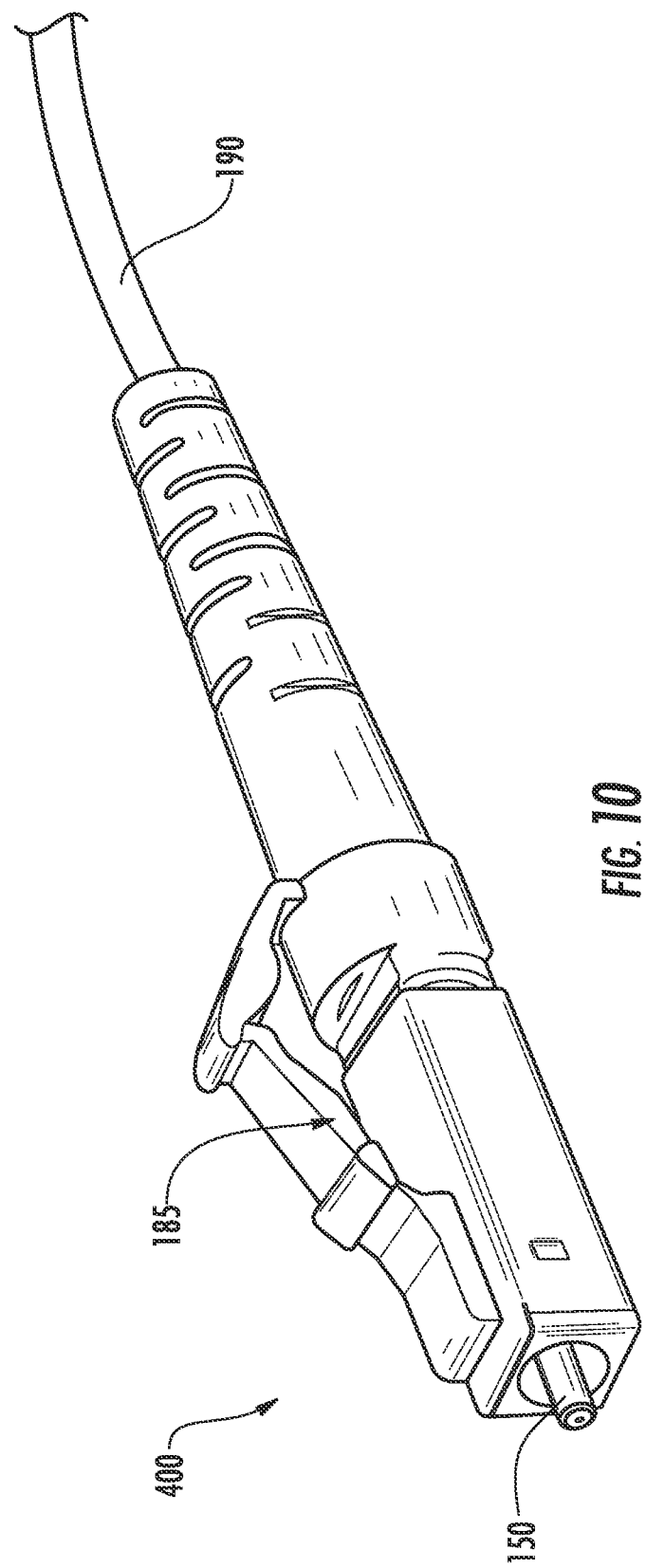
FIG. 10 is a perspective view of another fiber optic connector that includes a ferrule and ferrule holder similar to that of FIG. 8 as a portion of a cable assembly.

Illustratively, FIG. 10 depicts a cable assembly 400 having a ferrule assembly 150 that is similar to ferrule assembly 125 of FIG. 8, but ferrule assembly 150 is appropriately sized for an LC fiber optic connector 185. In other words, the ferrule and the ferrule assembly 150 are sized smaller for the LC fiber optic connector 185. Cable assembly also includes fiber optic cable 190 that provides an optical fiber for fiber optic connector 185. The ferrule and ferrule assemblies disclosed herein may be used with still other suitable fiber optic connectors such as duplex LC connectors and the like.

Figure 11:
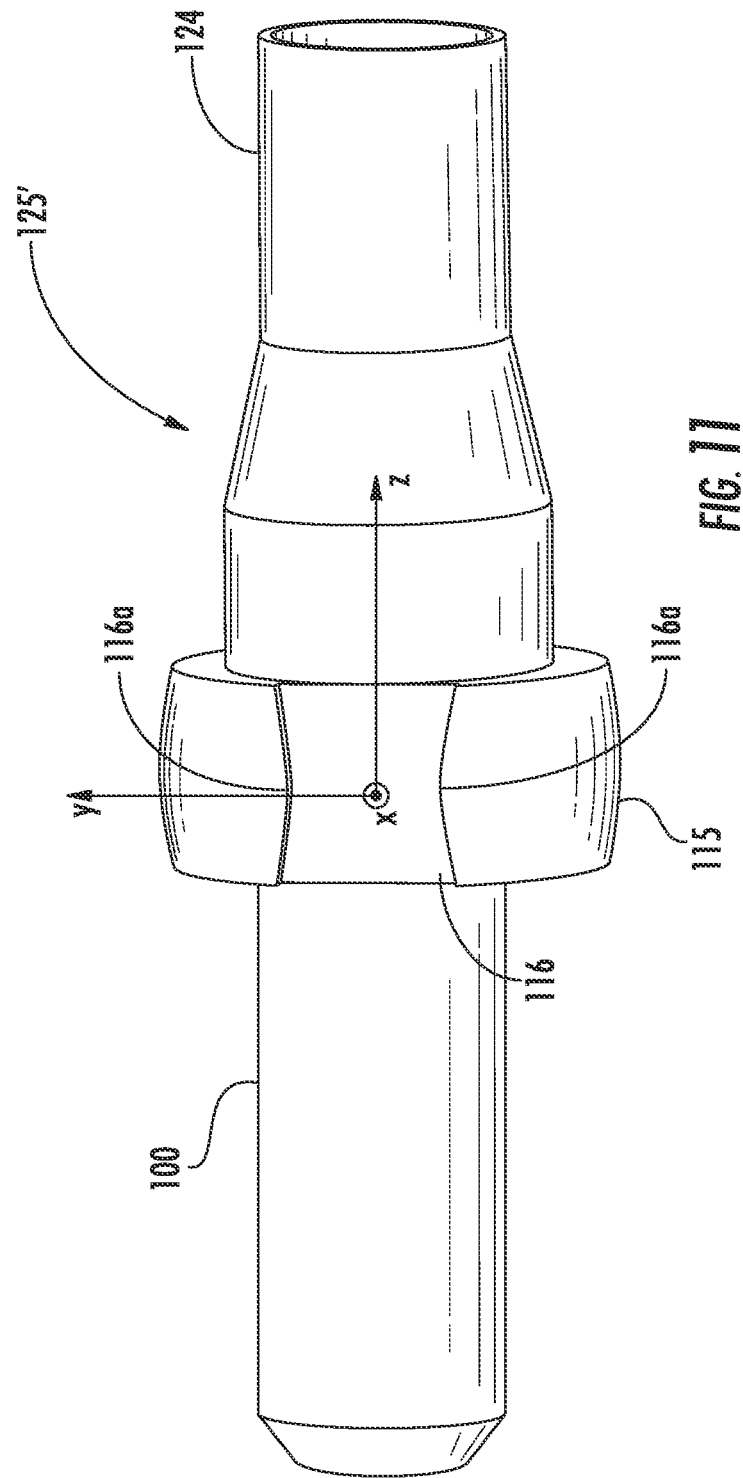
FIG. 11 is a perspective view of another ferrule holder that may be used with the ferrules disclosed herein.

FIG. 11 depicts a perspective view of another ferrule holder assembly 125' that may be used with ferrules disclosed herein. As shown, ferrule holder assembly 125' includes a ferrule holder 124 having a forward portion with a spherical feature for cooperating with the housing, thereby allowing relative movement therebetween. Specifically, the spherical feature of the ferrule holder permits rotational translation of the ferrule holder in two degrees of freedom relative to the housing and inhibits the longitudinal translation of the ferrule holder in same two degrees of freedom relative to the housing, thereby providing improved side-loading performance. FIG. 11 is a perspective view and a top view showing ferrule holder 114. FIG. 11 shows that the forward portion of ferrule holder 114 has a flat front face that is biased against a seat (not numbered) of a housing of the fiber optic connector. As shown in FIG. 11 keying features 116 of ferrule 124 have a profile (not numbered) shaped for allowing ferrule holder 114 to rotate about the X-axis when disposed within housing 16. Simply stated, the profile of the keying features 116 have two relatively shallow V-like portions 116a that are generally aligned with the spherical portion 115 of ferrule holder 124 forming an hourglass like profile, thereby allowing ferrule holder 114 to rotate about the X-axis relative to the housing of the fiber optic connector. Whereas, the spherical portion 115 allows ferrule holder 114 to rotate about the Y-axis relative to the housing. Ferrule holder 124 is disclosed in more detail in U.S. application Ser. No. 12/570,924 assigned to Corning Cable Systems, the disclosure of which is incorporated herein by reference.

Figure 12:
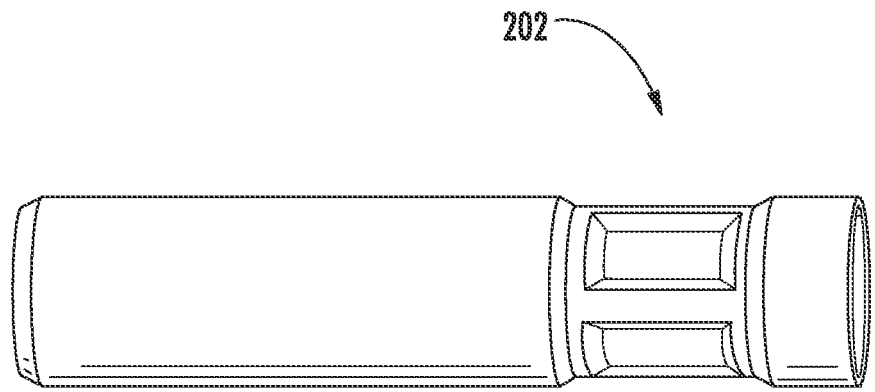
FIGS. 12-15 are perspective views of portions of other ferrules having at least one anti-rotation feature.
Figure 13:
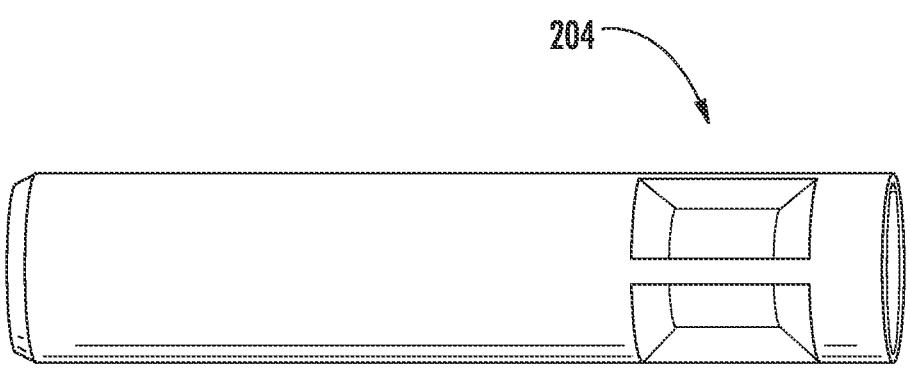
Figure 14:
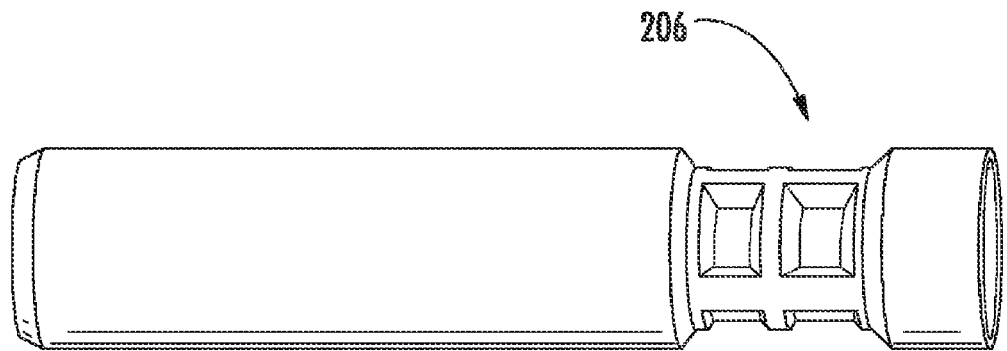
Figure 15:
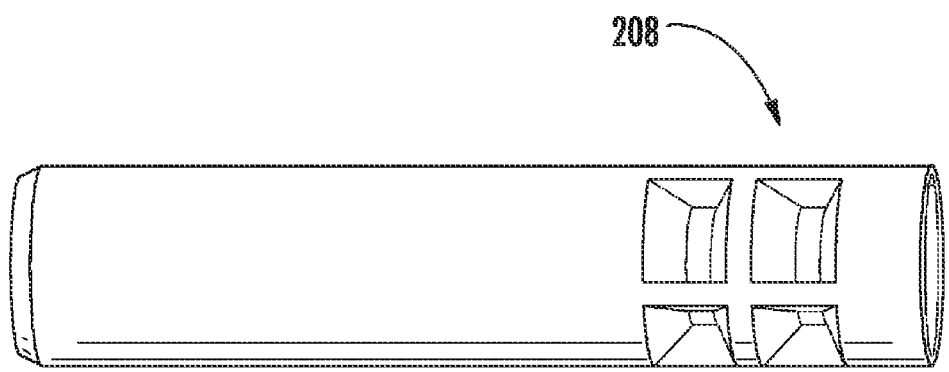
Figure 17:
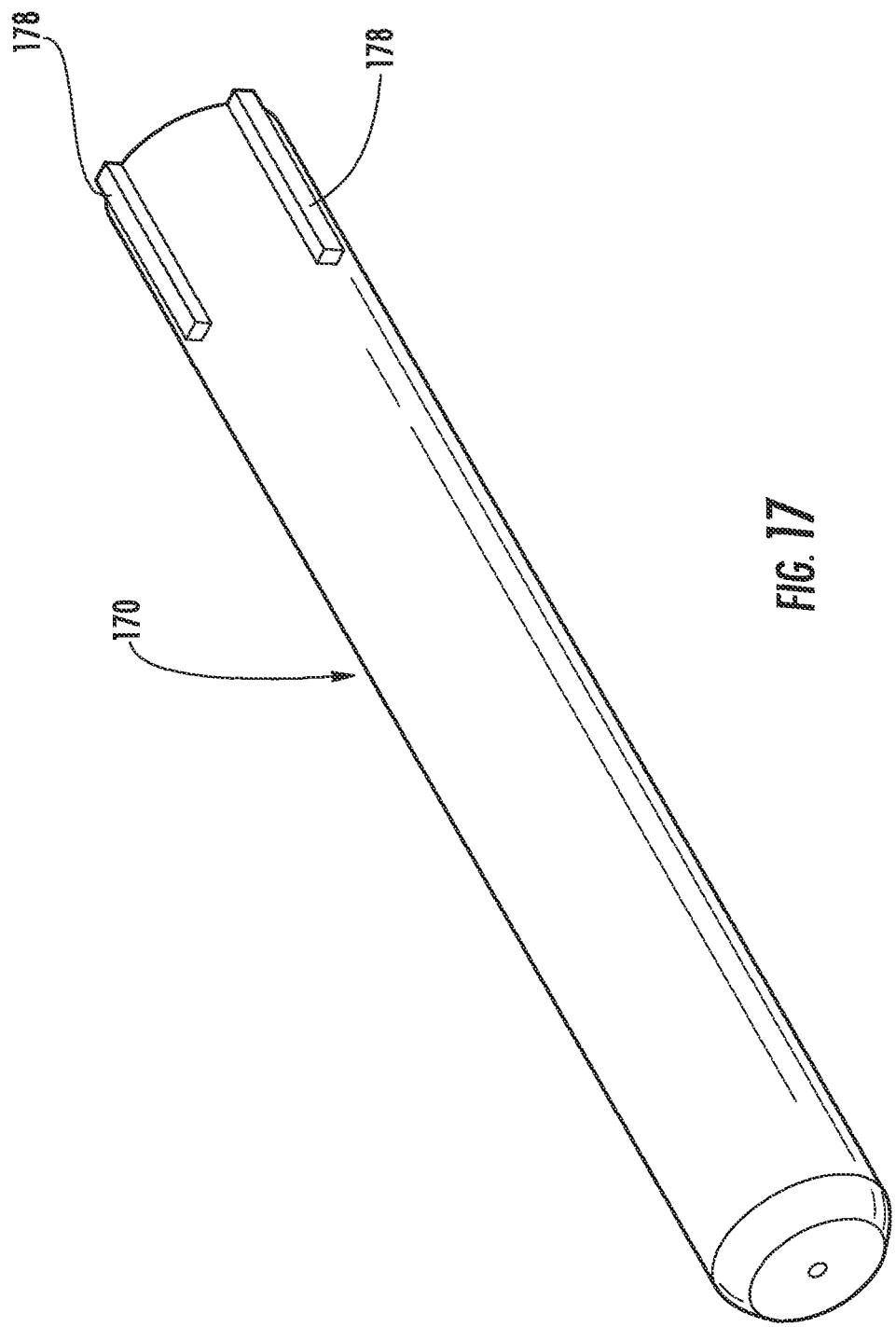
FIG. 17 is a perspective view of a still another ferrule having at least one anti-rotation feature that extends from the ferrule.

FIGS. 12-15 are perspective views of portions of still other variations of ferrules having at least one anti-rotation feature. FIGS. 12 and 13 show portions of ferrules 202 and 204 and are similar to ferrules shown above. Ferrules 206 and 208 of FIGS. 14 and 15 include radial ribbing in the recessed portion to create more compartments that are recessed as shown. FIG. 16 is a perspective view of still other variation of a ferrule 160 having at least one anti-rotation feature 168. As shown, ferrule 160 includes an anti-rotation feature configured as a female anti-rotation feature (i.e., a female rib that is recessed within the ferrule as a T-slot). In this embodiment, the female anti-rotation feature 168 allows interlocking between the ferrule and of the material of the ferrule holder that is molded thereover. Other variations of female anti-rotation features are possible such as an H-slot or other suitable shapes. FIG. 17 is a perspective view of still another ferrule 170 having at least one anti-rotation feature 178. In this embodiment, the anti-rotation feature is a rib that extends from the ferrule to allow interlocking with a ferrule holder that is molded thereover. In this embodiment, the ribs that form the anti-rotation features extend beyond the first diameter of the ferrule; instead of being recessed relative to the first diameter.

The ferrules disclosed herein have improved rotational retention to the ferrule holders that are molded thereto. Table 1 lists the minimum break torque for different ferrule designs in units of ounces-inch (oz-in). As used herein, "break torque" is the amount of torque required to break the bond between the ferrule and the ferrule holder, thereby allowing rotational movement therebetween. The minimum break torque is measured by sampling a small batch of ferrule such as ten ferrules and preferably more and recording the lowest sample of break torque. Ferrules disclosed have a minimum break torque that at least matches the prior art ferrule with two notches. In other words, the ferrules disclosed have a minimum break torque of at least 4 ounces-inch (oz-in), but other larger minimum break torques are possible for the ferrules, thereby improving the structural integrity.

Specifically, Table 1 lists two conventional ferrule designs with notches that are formed by grinding a blank and four different ferrules with anti-rotation portions (i.e., ribs). All of the tested ferrules in Table 1 were formed of ceramic with a polymer ferrule holder molded thereon. For instance, ferrule was formed from a ceramic such as zirconia and the ferrule holder is formed by a glass-filled PBT such as a 30 percent glass-filled polybutylene terephthalate (PBT). For testing the specific ferrule was secured in a collet of a lathe and then the torque was increased and the break torque was measured using a commercially available digital torque gauge. As shown, the conventional ferrule 10 of FIG. 1 had a low minimum break torque of 1.65 oz-in. The minimum break torque is increased when a conventional ferrule similar to ferrule 10 having two opposing notches (not illustrated) is tested, but this design requires another secondary grinding operation for removing the material. On the other hand, the ferrule designs represented in FIGS. 12-15 were tested with the results listed in Table 1. As shown, the ferrules using the concepts disclosed herein have improved structural integrity with a higher minimum break torque and average break torque for the sampling.

TABLE 1

Minimum Break Torque for Ferrule

| Ferrule Design | Minimum Break Torque (oz-in) | Average Break Torque (oz-in) |
|---|---|---|
| Ferrule 10 (FIG. 1) | 1.65 | 2.53 |
| Ferrule with two conventional notches (not illustrated) | 4.10 | 5.98 |
| Ferrule A (FIG. 12) | 7.20 | 9.41 |
| Ferrule B (FIG. 13) | 9.55 | 10.76 |
| Ferrule C (FIG. 14) | 9.00 | 10.66 |
| Ferrule D (FIG. 15) | 8.15 | 10.37 |

Also ferrules can include other structures or features. For instance, a ferrule may include an insert that is pressed into the body of the ferrule for aligning the optical fiber. The insert may have any suitable structure and/or material. By way of example, U.S. Pat. Nos. 4,867,525 and 4,994,134 disclose ferrules that use an insert, the disclosures of which are incorporated herein by reference.

Also disclosed are methods for making a ferrule for a fiber optic connector. The method includes the steps of providing a ferrule mold for producing an anti-rotation feature on the ferrule such as rib. Then, the ferrule mold is prepared and a ferrule material is placed into the ferrule mold. Finally, the ferrule with the anti-rotation features molded therein is removed from the ferrule mold. Further, the methods disclosed can further include the step of molding the ferrule holder about the ferrule to form the assembly as shown in FIG. 7. Thereafter, the fiber optic connector can be assembled using the ferrule assembly as a portion of the same and may also form a portion of a cable assembly having a fiber optic connector attached to the fiber optic cable.

Additionally, any suitable type of mold may be used for creating ferrules disclosed herein. By way of example, FIGS. 18 and 19 respectively depict a partially exploded perspective view and a detailed view of a component for a first type of ferrule mold 500 for making ferrules according to the method disclosed herein. Ferrule mold 500 includes a mold body 502, a pair of slides 504, and a core portion 506 as shown. Mold body 502 is shaped to provide the outer surface to the molded ferrule and core portion 506 includes a core pin 506a that cooperates with mold body 502 to form the optical fiber bore of the ferrule. In other words, core portion 506 moves relative to mold body 502 so that the core pin extends into mold body 502 at the appropriated location thereby forming the bore in the ferrule for an optical fiber.

Figure 18:
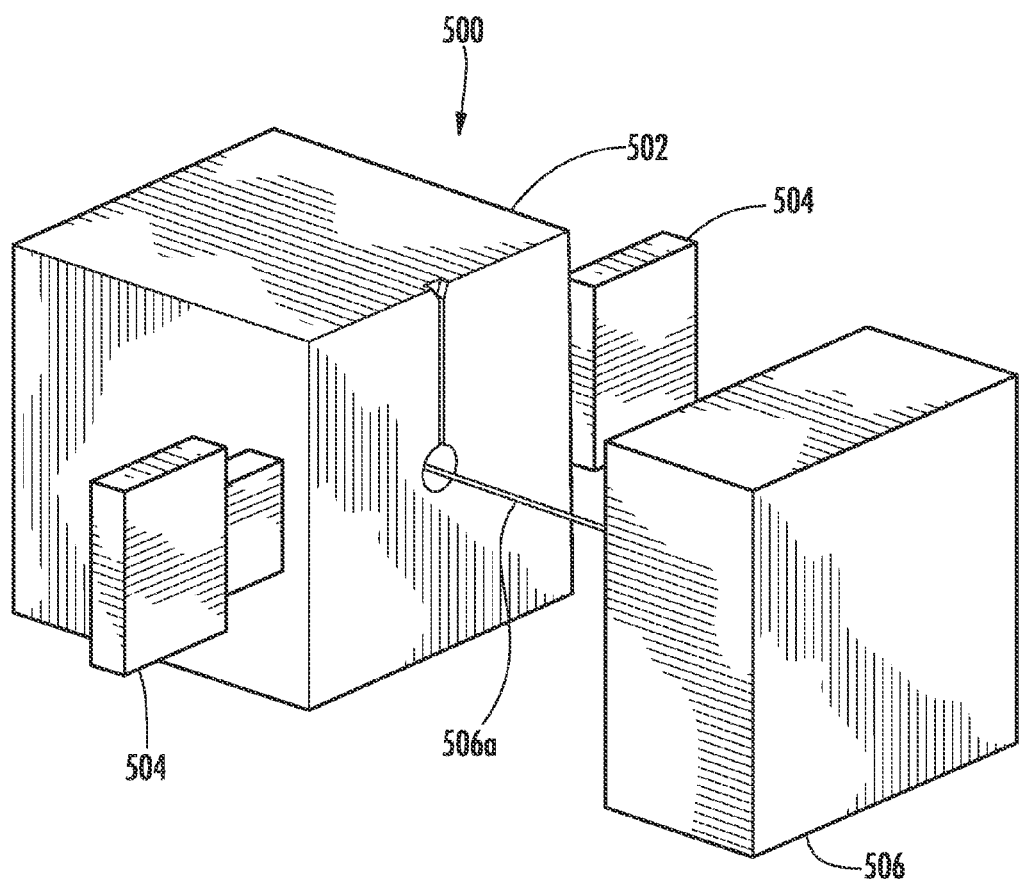
FIGS. 18 and 19 respectively depict a perspective and a detailed view for a first type of mold for making ferrules disclosed herein.
Figure 19:
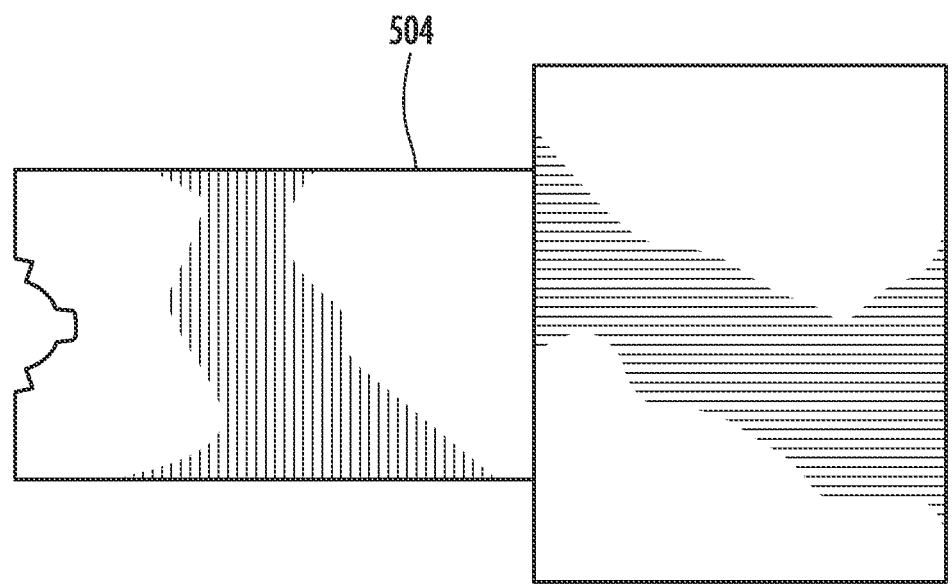

FIG. 19 shows a detailed view of one slide 504 for forming part of the recessed portion of the ferrule. As shown in FIG. 18, slides 504 fit into portions of mold body 502. In this embodiment, each slide 504 forms one-half of the recess portion of the ferrule. In other words, the ferrule mold has at least one anti-rotation forming portion. In this embodiment, ferrule mold 500 includes slides 504 having at least one portion for creating at least one anti-rotation portion of the ferrule. Other mold embodiments could use other numbers of slides such as four, but the slides should be designed so that they can release and be removed from the ferrule being molded. After assembly of the ferrule mold 500 components, the ferrule material is placed into the mold. Thereafter, the core portion 506 and slides 504 are removed and the molded ferrule is removed from the mold. The curing of the ferrule can use any suitable method or technique such as sintering depending on the ferrule material used. Additionally, other ferrule dressing/finishing operations may occur after molding such as smoothing part lines, removing the sprue, finishing the surface or the like, but no secondary grinding operations are required for forming the anti-rotation feature on the ferrule since they are molded into the same.

Figure 20:
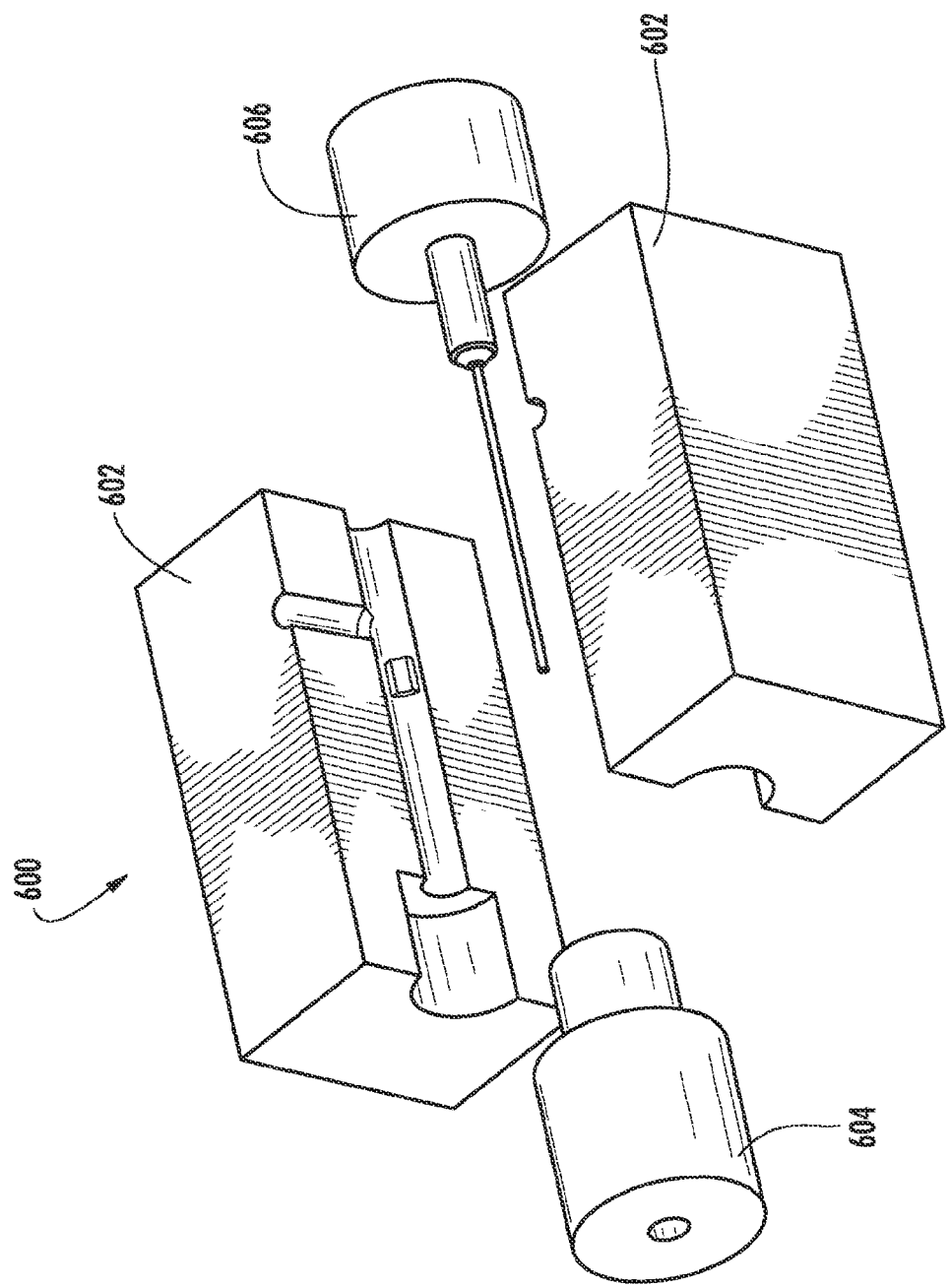
FIGS. 20 and 21 respectively depict a perspective exploded view and a side view for a second type of mold for making ferrules disclosed herein.
Figure 21:
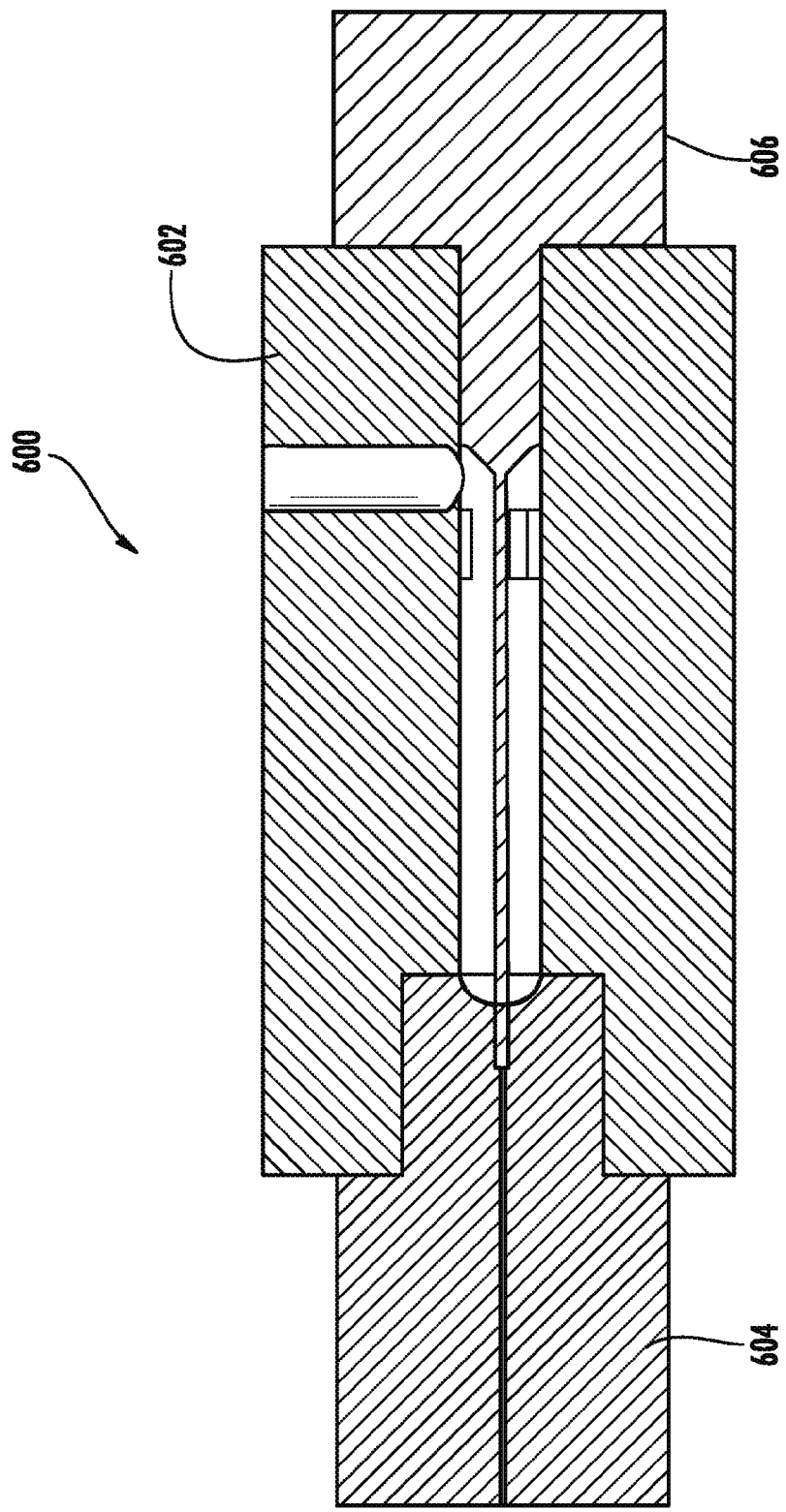

Other types of molds are also possible for forming ferrules disclosed herein. For instance, FIGS. 20 and 21 respectively depict a perspective exploded view and a side view for a second type of ferrule mold 600 for making ferrules disclosed herein. Ferrule mold 600 includes mold bodies 602, a core pin 604, and a core portion 606. Generally speaking, mold bodies fit together and provide a cavity for forming the general outer shape for the ferrule including the recessed portions. Then core pin 604 and core portion 606 are inserted at respective ends of mold bodies 602 to complete the mold 600 as shown in FIG. 21. In this embodiment, each mold body 602 has at least one anti-rotation forming portion. Still other mold designs and/or techniques are possible for forming ferrules described herein.

Although the disclosure has been illustrated and described herein with reference to preferred embodiments and specific examples thereof, it will be readily apparent to those of ordinary skill in the art that other embodiments and examples can perform similar functions and/or achieve like results. All such equivalent embodiments and examples are within the spirit and scope of the disclosure and are intended to be covered by the appended claims. It will also be apparent to those skilled in the art that various modifications and variations can be made to the present invention without departing from the spirit and scope of the same. Thus, it is intended that the present invention cover the modifications and variations of this invention provided they come within the scope of the appended claims and their equivalents.

We claim:

1. A ferrule for a fiber optic connector, comprising:
   a ferrule having a body with a first diameter and at least one bore, the at least one bore extending from a rear end of the ferrule to a front end of the ferrule, wherein the ferrule has at least one anti-rotation rib located at a recessed portion of the body, wherein the ferrule has a contact angle that is a positive two degrees or less.

2. The ferrule of claim 1, wherein the ferrule has at least two anti-rotation portions.

3. The ferrule of claim 1, wherein the at least one anti-rotation portion has an outer dimension that is essentially the same as the first diameter.

4. The ferrule of claim 1, wherein the ferrule has at least four anti-rotation portions.

5. The ferrule of claim 1, having a ferrule holder molded about the rear end of the ferrule.

6. The ferrule of claim 5, wherein the ferrule holder has a spherical feature.

7. The ferrule of claim 1, the ferrule being a portion of a fiber optic connector.

8. The ferrule of claim 1, the ferrule being a portion of a fiber optic connector and the fiber optic connector being a portion of a cable assembly.

9. The ferrule of claim 8, further including a ferrule holder molded about the rear end of the ferrule to form a ferrule holder assembly, wherein the ferrule holder assembly has a minimum break torque of 4 ounce-inches.

10. The ferrule of claim 1, the ferrule having more than two recessed portions and anti-rotation portions.

11. A ferrule and a ferrule holder for a fiber optic connector, comprising:
   a ferrule having a body with a first diameter and at least one bore, the at least one bore extending from a rear end of the ferrule to a front end of the ferrule, wherein the ferrule has at least one anti-rotation portion; and
   a ferrule holder, wherein the ferrule holder is molded about a portion of the ferrule and the ferrule has a contact angle that is a positive two degrees or less to provide improved rotation retention with the ferrule holder.

12. The ferrule of claim 11, wherein the at least one anti-rotation portion is located at a recessed portion.

13. The ferrule of claim 11, wherein the at least one anti-rotation portion has an outer dimension that is essentially the same as the first diameter.

14. The ferrule of claim 11, wherein the ferrule has at least four anti-rotation portions.

15. The ferrule of claim 11, further including at least one recessed portion molded into the ferrule.

16. The ferrule of claim 11, the ferrule being a portion of a fiber optic connector.

17. The ferrule of claim 11, the ferrule being a portion of a fiber optic connector and the fiber optic connector being a portion of a cable assembly.

18. The ferrule of claim 17, the ferrule holder being molded about the rear end of the ferrule to form a ferrule holder assembly, wherein the ferrule holder assembly has a minimum break torque of 4 ounce-inches.

19. The ferrule of claim 11, wherein the ferrule holder has a spherical feature.

20. The ferrule of claim 11, the ferrule having more than two recessed portions and anti-rotation portions.

21. A method for making a ferrule for a fiber optic connector, comprising:
   providing a ferrule mold having at least one anti-rotation forming portion;
   placing a ferrule material into the ferrule mold; and
   removing a ferrule from the ferrule mold, wherein the ferrule has a contact angle that is a positive two degrees or less.

22. The method of claim 21, further including the step of molding a ferrule holder about the ferrule.

23. The method of claim 21, the ferrule forming a portion of a fiber optic connector.

24. The method of claim 21, the ferrule having more than two recessed portions and anti-rotation portions.

* * * * *